J. P. EDWARDS.
DEVICE FOR SHARPENING LAWN MOWERS.
APPLICATION FILED DEC. 19, 1912.
1,073,412.
Patented Sept. 16, 1913.
2 SHEETS—SHEET 2.
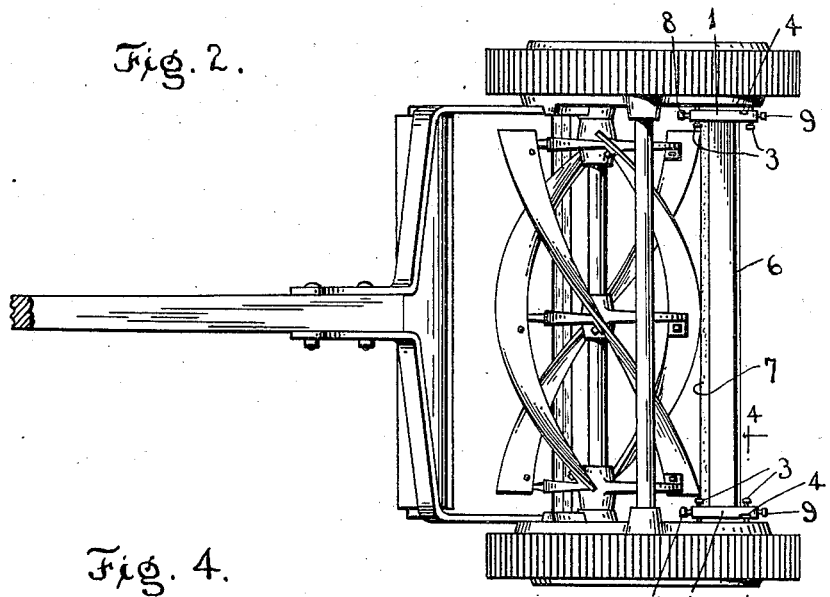
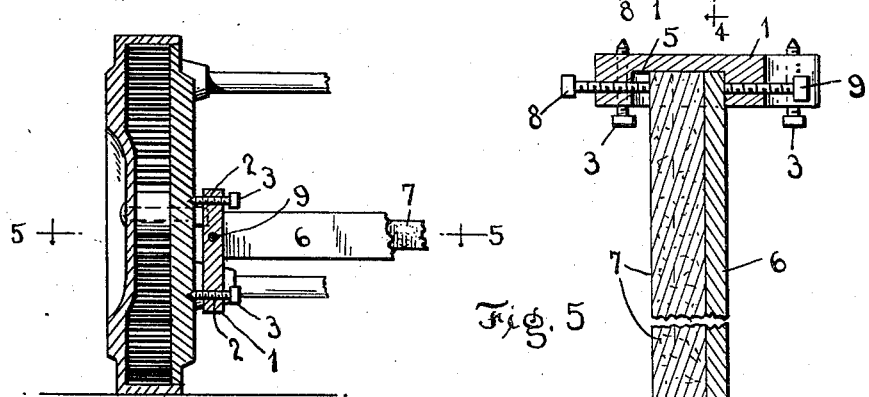
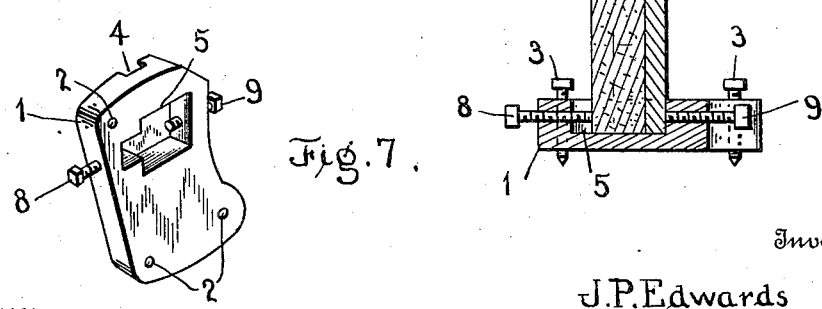
Inventor
J. P. Edwards
Witnesses

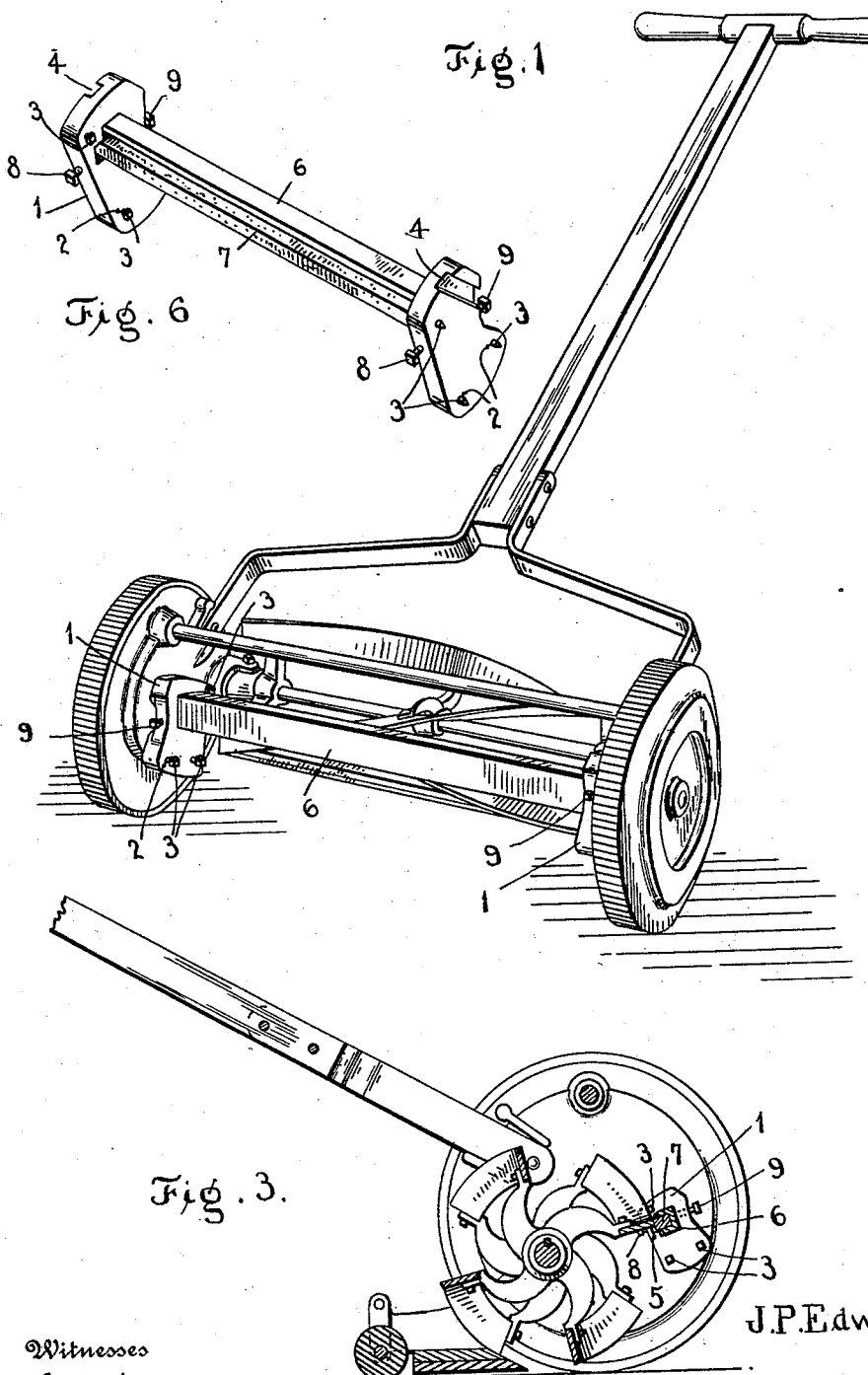

UNITED STATES PATENT OFFICE.

JOHN P. EDWARDS, OF KINMUNDY, ILLINOIS.

DEVICE FOR SHARPENING LAWN-MOWERS.

1,073,412. Specification of Letters Patent. Patented Sept. 16, 1913.

Application filed December 19, 1912. Serial No. 737,724.

*To all whom it may concern:*

Be it known that I, JOHN P. EDWARDS, a citizen of the United States, residing at Kinmundy, in the county of Marion and State of Illinois, have invented certain new and useful Improvements in Devices for Sharpening Lawn-Mowers; and I do declare the following to be a full, clear, and exact description of the invention, such as will enable others skilled in the art to which it appertains to make and use the same.

This invention relates to improvements in devices for sharpening lawn mowers.

One object of the invention is to provide a sharpening device of this character which may be readily attached to a lawn mower and which is provided with means for adjusting the sharpening element for properly engaging the blades of the machine when they are revolved.

Another object is to provide a lawn mower sharpener which will be simple, strong, durable and inexpensive in construction, efficient and reliable in operation and well adapted to the purpose for which it is designed.

In the accompanying drawings, Figure 1 is a perspective view of a lawn mower showing my improved sharpening device applied thereto; Fig. 2 is a plan view of the same; Fig. 3 is a vertical cross sectional view through the lawn mower and the sharpening device showing the manner in which the blades are engaged in the latter; Fig. 4 is a vertical longitudinal section through the wheel and part of the frame at one end of the machine and through one of the attaching members of the sharpening devices; Fig. 5 is a horizontal sectional view through the sharpening device removed from the mower; Fig. 6 is a detail perspective view of the same; Fig. 7 is a similar view of one of the supporting and attaching plates of the sharpening device.

My improved lawn mower sharpener comprises a pair of attaching and supporting plates 1 which are of substantially oblong shape and in which near three of its outer corners are formed threaded screw holes 2 with which are engaged attaching screws 3 by means of which the device is secured to a lawn mower as clearly shown in the drawings. In the outer sides of the plates 1 near their upper inner corners are obliquely disposed grooves or channels 4 which when the device is applied to mowers having open work or skeleton side plates, are adapted to receive one of the bars or ribs of the plates whereby the device is securely held in position.

In the inner sides of the plates 1 near their upper ends are elongated T-shaped recesses or sockets 5 which are adapted to receive the ends of the box or casing 6 for the grinding element 7 of the device, the ends of which are engaged with the reduced portions of the recesses 5 as clearly shown in Fig. 6 of the drawing. The box or casing 6 and the grinding element 7 are adjustably secured in the recesses 5 by inner and outer set screws 8 and 9 which are engaged with threaded apertures in the inner and outer edges of the plates 2 as clearly shown in Figs. 6 and 7 of the drawing. The grinding element 7 may be in the form of a stone or may be constructed of metal or other suitable grinding material.

In applying the device to the mower the attaching plates 1 are engaged with the inner sides of the wheel frames in substantially the positions shown in Fig. 1 of the drawing wherein the outer edge of the grinding element 7 will be in position to receive and grind the edges of the blade. When thus arranged the plates 1 are securely clamped between the side, or wheel plates of the mower by the screws 3 or by any other suitable fastening devices whereby the sharpening device will be rigidly held in position. After the device is thus secured to the mower the box or casing 6 and the grinding element 7 may be adjusted inwardly or outwardly by means of the set screws 8 and 9 to bring the grinding element into proper position for accurately grinding the edges of the blades as they are revolved in the mower.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A lawn mower sharpening device comprising a pair of attaching plates having T-shaped recesses in their inner faces, means for securing said plates in operative position, a grinding element casing having its ends engaged with the larger portion of the recesses in said attaching plates, a grinding element carried by said casing and having its ends engaged with the reduced portions of said recesses, set screws arranged on said attaching plates and having their inner ends engaged with the ends of said casing and said grinding element, whereby said parts are adjustably fastened in position for engaging the grinding element with the blades when the latter are revolved.

2. In a lawn mower sharpening device, a pair of attaching plates having in their outer sides obliquely disposed grooves and having in their inner sides T-shaped recesses, gripping screws having a threaded engagement with said plates and adapted to be screwed into engagement with the side plates of the mower whereby the sharpening device is rigidly secured in operative position, a grinding element casing having its ends engaged with the larger portion of the recesses in said attaching plates, a grinding element carried by said casing and having its ends engaged with the reduced portions of said recesses, set screws arranged in said attaching plates and having their inner ends engaged with the ends of said casing, and said grinding element whereby these parts are adjusted and fastened in position for engaging the grinding element with the blades when the latter are revolved.

In testimony whereof I have hereunto set my hand in presence of two subscribing witnesses.

JOHN P. EDWARDS.

Witnesses:
WILLIAM J. SPENCER,
JOSEPH ATKINS.

Copies of this patent may be obtained for five cents each, by addressing the "Commissioner of Patents, Washington, D. C."